United States Patent Office 3,238,244
Patented Mar. 1, 1966

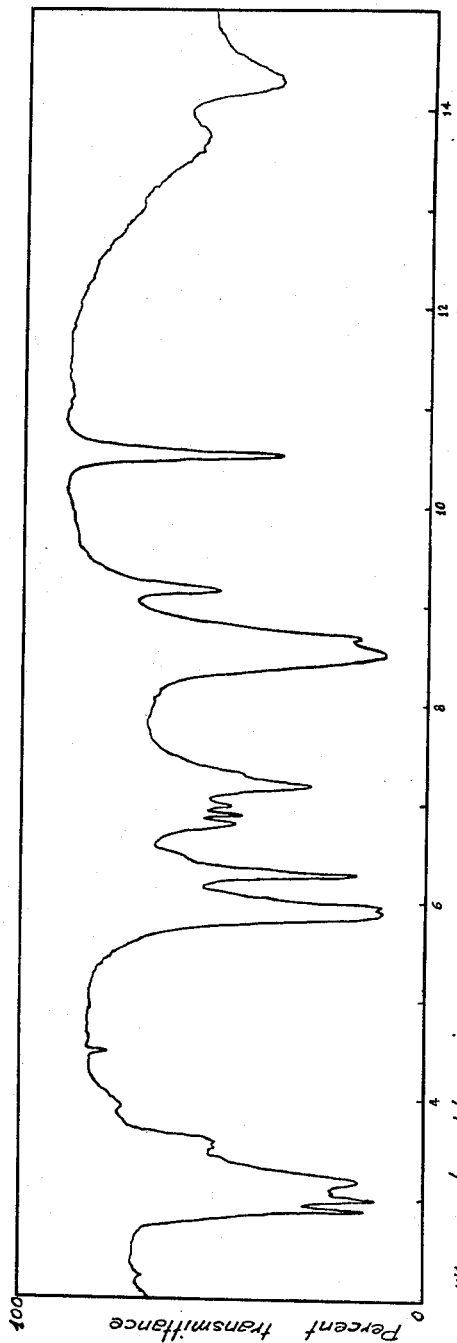

3,238,244
PROCESS FOR OBTAINING α-CYANO-α-HYDROXY PROPIONAMIDE AND THE PRODUCT THEREBY OBTAINED
Adriano Nenz, Milan, and Luigi Marangoni, Limbiate, Milan, Italy, assignors, by mesne assignments, to Edison, Milan, Italy, a corporation of Italy
Filed Apr. 18, 1963, Ser. No. 273,965
9 Claims. (Cl. 260—465.4)

The present invention relates to a new compound and a process of preparation; in particular the invention is concerned with the preparation of α-cyano-α-hydroxy propionamide and the process of preparation by the reaction of α-keto-propanaloxime and hydrocyanic acid.

The compound α-cyano-α-hydroxy propionamide heretofore has not been known in the art. Accordingly, no method for its preparation is known and of course none of its chemical and physical-chemical characteristics or its properties have been revealed.

It is therefore an object of this invention to provide the new and useful compound, α-cyano-α-hydroxy propionamide.

Another object of the present invention is to provide a process for the preparation of α-cyano-α-hydroxy propionamide.

A further object of the present invention consists in providing a process suitable for the preparation of an α-cyano-α-hydroxy propionamide which uses as the starting or raw material, a relatively inexpensive and easily obtainable compound.

A still further object of this invention is to provide a relatively inexpensive process for obtaining the novel compound α-cyano-α-hydroxy propionamide, in quantitative amounts.

Last but not least of the objects of this invention is obtaining α-cyano-α-hydroxy propionamide which is of great commercial significance as a chemical intermediate in the preparation of polymeric films, fibers, and the like. Other objects and advantages of the invention will appear from the following description of the present invention.

According to the present invention, it has been found that the α-cyano-α-hydroxy propionamide can be obtained in good yields by the process of reacting α-keto-propanaloxime with hydrocyanic acid.

The temperature at which the process is carried out may vary in the range of from about 10°-50° C.; however, in the preferred embodiment the reaction is carried out at a temperature of around 30° C.

Where desired to accelerate the reaction, a catalyst may be utilized in the method of this invention. We have found that compounds selected from the groups consisting of strong organic and inorganic base act as effective catalysts. By way of specific examples of suitable catalysts falling within these classes there may be mentioned piperidine, inorganic and alkali metal hydroxides and cyanides.

In place of the alkali metal hydroxide which in the presence of hydrocyanic acid gives rise to the salt, i.e. the alkali metal cyanide, the cyanide salt per se may be utilized initially as the reaction catalyst.

The amount of catalyst required in the process of this invention is relatively small, i.e., the amounts used are usually of the order of about 1 to 3 molar percent calculated with respect to the hydrocyanic acid starting material.

It will be appreciated that the process of the present invention may be carried out in the absence of solvents or suspending liquids by simply and directly reacting the α-keto-propanaloxime with hydrocyanic acid; however, the process is advantageously carried out by conducting the reaction in a medium consisting of an inert organic liquid. Organic liquids found most satisfactory in the preparation of α-cyano-α-hydroxy propionamide by the present method are selected from the class of aliphatic chlorinated hydrocarbons. By way of specific example of useful liquids falling within this class there may be mentioned carbon tetrachloride, dichloroethane and chloroform.

The α-keto-propanaloxime and hydrocyanic acid starting material reacted in equimolecular quantities. A slight excess of hydrocyanic acid may be used however to insure complete reaction.

The reaction occurring in the process of our invention can be schematically represented as follows:

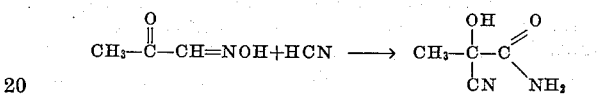

It has been theorized that the reaction occurs in distinct stages as follows:

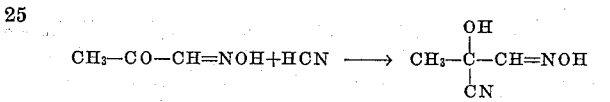

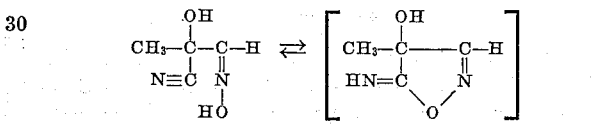

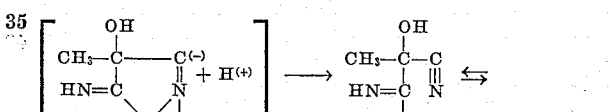

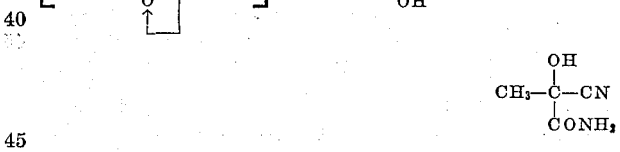

In effect it is theorized that hydrocyanic acid first reacts with α-keto-propanaloxime to give α-cyano-α-hydroxy -propanaloxime which in turn undergoes a cyclization to give 4-hyroxy-4-methyl-5-imino-isoxazoline. The latter, by reaction through an ionic intermediate undergoes a ring cleavage to yield the tautomeric form of α-cyano-α-hydroxy propionamide that finally rearranges to form the α-cyano-α-hydroxy propionamide.

The foregoing is offered by way of explanation of the reactions occurring in our method of producing the novel α-cyano-α-hydroxy-propionamide and is not intended that the invention be limited by such explanation.

The novel α-cyano-α-hydroxy propionamide compound of this invention exhibits the following physical and chemical properties: white microcrystalline substance; melting point of from 88°-89° C.; soluble in water, in methyl and ethyl alcohol, dioxane, formamide, dimethylformamide, ethyl ether (solubility in ethyl ether 1.5%), but insoluble in benzene, chloroform, carbon tetrachloride, dichloroethane, chlorobenzene, ethyl acetate, petroleum ether, toluene and xylene. The compound is stable in air and ordinary light and decomposes only after prolonged heating above its melting point.

FIGURE 1 shows the absorption band in the I.R. of the α-cyano-α-hydroxy propionamide (spectrophotometer Perkin-Elmer mod. 21-NaCl-prism band recorded in KBr at about 1% of α-cyano-α-hydroxy propionamide); the following maximum absorption-bands appear therein:

| | Micron |
|---|---|
| Characteristics of the CN group | at 4.46 |
| Characteristics of a CONH₂ group | at 2.9<br>at 3.0<br>at 3.2<br>at 5.91<br>at 6.29 |
| Characteristics of the CH₃ group | at 7.20 |
| Characteristics of the tertiary OH group | at 8.52 |

The α-cyano-α-hydroxy propionamide is extremely useful as a chemical intermediate in view of the numerous reactions and transformations which may be facilitated by its use. For example, the compound can be easily treated with acetic anhydride to form α-cyano-α-acrylamide and vinylidene cyanide, which monomers are useful in the preparation of polymeric films, fibers and such. Moreover, the novel product of this invention may be converted into intermediate products such as methyl tartronamide and methyl tartronic acid and its esters by treating with aqueous solutions of strong inorganic acids (HCl or $H_2SO_4$).

The α-keto propanaloxime starting material is known and may be obtained for example by reacting acetoacetic ester or acetone with an inorganic nitrite and an inorganic acid.

Further advantages of the present invention will be appreciated from a study of the following examples which are illustrative of the method of this invention.

Example 1

In a 2 l. flask provided with a stirrer and with a reflux condenser, 300 g. of α-keto-propanaloxime, 1670 g. of $CCl_4$, 96 g. of liquid HCN and 3 g. of piperidine were introduced with vigorous stirring. The temperature was varied from about 20° C. and +40° C. As soon as the reactants formed into a compact crystalline mass, the liquid was decanted and the solid crushed and suspended as a fine powder in ethyl ether. By filtration of the ether suspension, 340 g. of a yellowish crystalline product composed of substantially pure α-cyano-α-hydroxy propionamide, having a M.P. of 79°–80° C., was obtained.

Elementary analysis of the product revealed the following composition: C=42.3% (theor. 42.03%), H=5.4% (theor. 5.30%), N=24.4% (theor. 24.55%). From the ether solution an additional 25.6 g. of product was recovered having a M.P. of 82–84° C. The total yield of α-cyano-α-hydroxy propionamide was 92.9% based on α-keto-propanaloxime and 90.2% when based on hydrocyanic acid.

The product when recrystallized from a chloroform/ethanol mixture was white in color, had a M.P. of 88°–89° C. and is soluble in $H_2O$, EtOH, MeOH, dioxane, formamide, dimethylformamide and ethyl ether (1.5%), but insoluble in $C_6H_6$, $CHCl_3$, $CCl_4$, dichloroethane, chlorobenzene, ethylacetate, petroleum ether, toluene and xylene. It is stable in air and ordinary light. It ignites and decomposes only after prolonged heating at temperatures above the melting point.

Example 2

100 g. of α-keto-propanaloxime are added to a solution of 1 g. of piperidine in 32 g. of liquid hydrocyanic acid in a 250 cc. flask equipped with a stirrer and reflux condenser. This mixture was maintained under reflux with stirring at a temperature of about 30° C. until a compact crystalline mass was formed. The solid mass was then treated as in the preceding example.

111 g. of α-cyano-α-hydroxy propionamide having a M.P. of 79°–81° C. was obtained. The yield based on the α-keto-propanaloxime was 84.7%.

The elementary analysis revealed a composition of: C=42.2%; H=5.4%, N=24.7%. The product, when recrystallized from a chloroform-alcohol mixed solvent, melted at 88°–89° C.

Example 3

Under the same conditions as described in the preceding examples, 100 g. of α-keto-propanaloxime were reacted with 32 g. of HCN dissolved in carbon tetrachloride in the presence of 0.8 g. of KCN as catalyst.

108 g. of a crystalline solid with a M.P. of 75°–78° C. were obtained. Elementary analysis revealed the composition: C=42.0%, H=5.4%, N=24.4%. The yield, based on the α-keto-propanaloxime was 82.5%.

Example 3 was repeated employing 0.5 g. of NaOH as catalyst in place of KCN and the same results were obtained.

We claim:
1. α-cyano-α-hydroxy propionamide.
2. Process for preparing α-cyano-α-hydroxy propionamide which comprises reacting α-keto-propanaloxime with hydrocyanic acid in the presence of a basic catalyst selected from the group consisting of piperidine, alkali metal hydroxides and alkali metal cyanides at a temperature between about 10° to 50° C.
3. The process of claim 2 wherein said basic catalyst is sodium hydroxide.
4. The process of claim 2 wherein said basic catalyst is an alkali metal cyanide.
5. The process of claim 2 wherein said alkali metal cyanide is potassium cyanide.
6. The process of claim 2 wherein said catalyst is piperidine.
7. The process of claim 2 wherein the reaction between the α-keto-propanaloxime and hydrocyanic acid is effected in the presence of an organic solvent selected from the group consisting of carbon tetrachloride, dichloroethane and chloroform.
8. The process for preparing α-cyano-α-hydroxy propionamide which comprises reacting α-keto-propanaloxime with hydrocyanic acid at a temperature between about 100 to 50° C.
9. The process of preparing α-cyano-α-hydroxy propionamide which comprises reacting equimolar quantities of α-keto-propanaloxime and hydrocyanic acid in the presence of a catalystic quantity of piperidine at a temperature between about 10° and 50° C.

No references cited.

CHARLES B. PARKER, *Primary Examiner.*

JOSEPH P. BRUST, *Assistant Examiner.*